United States Patent [19]

Felici

[11] Patent Number: 5,273,493
[45] Date of Patent: Dec. 28, 1993

[54] TRACKING DEVICE FOR ENDLESS BELTS MOVING ON ROLLERS

[75] Inventor: Alberto Felici, Revigliasco, Italy

[73] Assignee: Unibase S.p.A., Milan, Italy

[21] Appl. No.: 876,430

[22] Filed: Apr. 29, 1992

[30] Foreign Application Priority Data

May 3, 1991 [IT] Italy .................. MI91 A 001210

[51] Int. Cl.$^5$ .................................. F16H 7/22
[52] U.S. Cl. .................. 474/108; 474/151; 474/159; 51/135 BT; 51/170 EB
[58] Field of Search ............... 474/101, 102, 106–108, 474/119, 124, 131, 151, 259–261, 273; 51/170 EB, 135 R, 135 BT

[56] References Cited

U.S. PATENT DOCUMENTS

| | | | |
|---|---|---|---|
| 2,565,223 | 8/1951 | Gentzel | 51/170 EB |
| 2,857,717 | 10/1958 | Edgemond, Jr. et al. | |
| 3,029,568 | 4/1962 | Lubas | 51/170 EB |
| 3,359,689 | 2/1967 | McCarty et al. | 51/135 |
| 3,465,479 | 9/1969 | Foody et al. | 51/170 EB |
| 3,665,650 | 5/1972 | Przygocki | 51/135 BT |
| 3,789,552 | 2/1974 | Bradbury et al. | 474/102 X |
| 4,177,609 | 12/1979 | Rameckers et al. | |
| 4,574,531 | 3/1986 | McCurry | 51/135 BT |
| 4,742,649 | 5/1988 | Fuchs | |
| 5,007,205 | 4/1991 | Farmerie | |

FOREIGN PATENT DOCUMENTS

| | | |
|---|---|---|
| 2920393 | 11/1980 | Fed. Rep. of Germany . |
| 3844358 | 7/1990 | Fed. Rep. of Germany . |
| 1075114 | 10/1954 | France . |

Primary Examiner—Ramon S. Britts
Assistant Examiner—Roger J. Schoeppel
Attorney, Agent, or Firm—Young & Thompson

[57] ABSTRACT

A tracking device for endless belts moves on a pair of rollers—a driving roller (RM) and a tension roller (1)—especially for an emery cloth belt (TS) moving on the cantilevered rollers (1, RM) of a belt sander (S) for wooden floors. The tension roller (1) is formed in two parts: a minor portion (3), close to a support (5) of the roller shaft (2), mounted—rotatable but not inclinable in respect of said shaft—onto an eccentric rotary sleeve (11), its part closest to the support (5) being of frusto-conical shape; and a major portion (4), mounted revolving on a bush (12) coaxial to the roller shaft (2) and inclinable on a ball joint (13) but not rotatable in respect of the shaft. A unilateral contact ball constraint (15) is moreover provided between the sleeve (11) and the bush (12), and at least one spring (16) is provided to cause the inclination of the bush (12) in respect of the roller shaft (2) in the direction allowed by the constraint (15).

7 Claims, 3 Drawing Sheets

TRACKING DEVICE FOR ENDLESS BELTS MOVING ON ROLLERS

BACKGROUND OF THE INVENTION

It is well known in technique to have to carry out, in a very large number of mechanical applications, the centering of endless belts moving on rollers. Said centering is required to correct the misplacements of the belts, as they move on the rollers supporting them and causing their motion and tensioning, which misplacements may be determined by external stresses, by inner strains and/or by the imperfectly cylindrical configuration of the belts and of the rollers.

The problem arises, for example, in belt conveyors, in belt presses and in belt-sanding machines. It is particularly felt in belt sanders for wooden floors (especially wood-block flooring), wherein an endless abrasive belt is rotated on two rollers—a driving roller and a tension roller—which are often cantilevered.

According to known technique, either fixed or self-centering arrangements are adopted. In the first case, it is not possible to self-center the belt, the misplacements of which must therefore be tolerated, or corrected by hand if they become intolerable. In the second case, self-centering is guaranteed, but—in the constructions realized up-to-date—the centering device usually takes up a lot of space on both sides (which is particularly prejudicial in belt sanders for wooden floors) and, furthermore, it provides for the use of position sensors and actuators, which makes it very complicated and costly.

The object of the present invention is to eliminate the drawbacks of known technique by supplying an automatic mechanical belt centering device, of efficient working and simple construction, which can thus be used in all those cases requiring a practical—but not too costly and complicated—solution of the problem.

SUMMARY OF THE INVENTION

To reach this object, the invention supplies an automatic mechanical centering device for endless belts moving on a pair of rollers—a driving roller and a tension roller—characterized in that the tension roller is formed in at least two parts: a minor portion, close to a support of the roller shaft, mounted—rotatable but not inclinable in respect of said shaft—onto an eccentric rotary sleeve, its part closest to said support being of frustoconical shape; and a major portion, mounted revolving on a bush coaxial to the roller shaft and inclinable on a ball joint, but not rotatable in respect of said shaft; a unilateral contact ball constraint being moreover provided between said sleeve and said bush, and at least one spring being provided to cause the inclination of said bush in respect of the roller shaft, in the direction allowed by said constraint.

The tension roller of the device can be mounted on a cantilevered shaft—in which case, it comprises only one minor portion and only one major portion—or it can be mounted on a shaft with two end supports, in which case it comprises two minor lateral portions and a single larger central portion. In this second case, two unilateral ball constraints have to be provided between the sleeves of the minor portions and the bush of the larger portion, as well as two springs causing the inclination of said bush.

BRIEF DESCRIPTION OF THE DRAWINGS

The invention is described hereinafter in further detail, with reference to the accompanying drawings, which show a preferred embodiment thereof applied to a belt sander for wooden floors, and in which.

DESCRIPTION OF THE PREFERRED EMBODIMENTS

Figure 1:
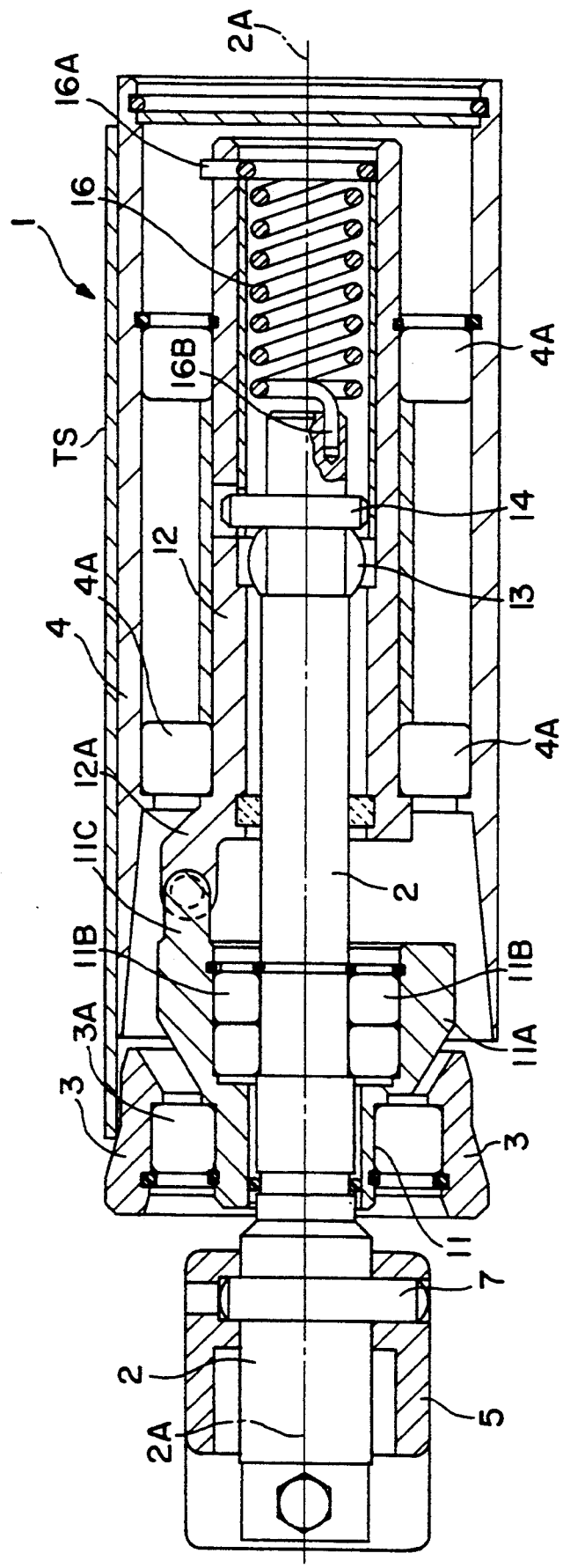
FIG. 1 is an axial section view, along a vertical plane, of a cantilevered tension roller—forming part of an endless belt motion system—comprising the automatic centering device according to the invention.

With reference to the drawings, the tension roller 1 mounted cantilevered on an endless belt motion system—for instance, the cantilevered tension roller 1 for tensioning the endless emery cloth belt TS of a belt sander S for wooden floors (FIG. 3), which belt also partially winds around a driving roller RM of larger diameter, also mounted cantilevered on the same belt sander S—comprises (FIGS. 1 and 2) a shaft 2 and two roller portions 3 and 4.

Figure 2:
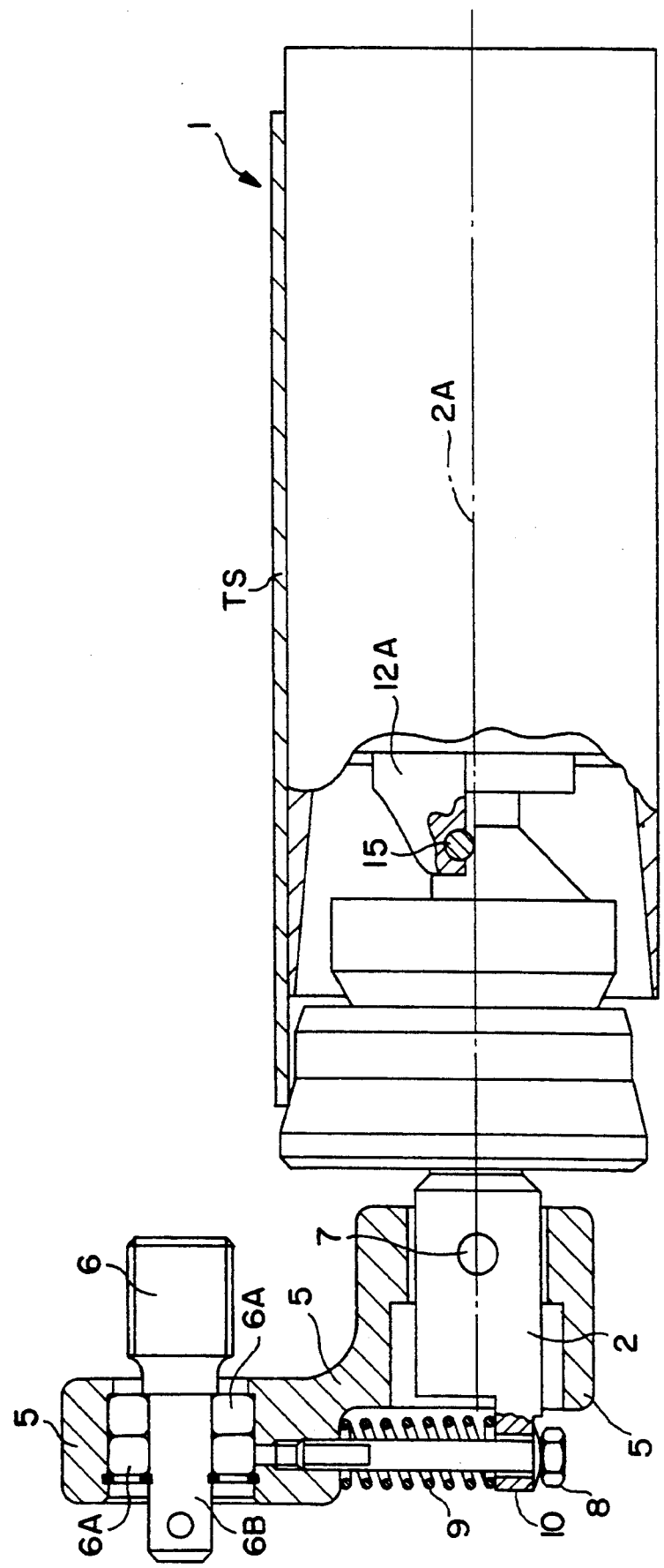
FIG. 2 is an axial top view, partially sectioned along a horizontal plane, of the same roller of FIG. 1 and of the respective shaft support.
Figure 3:
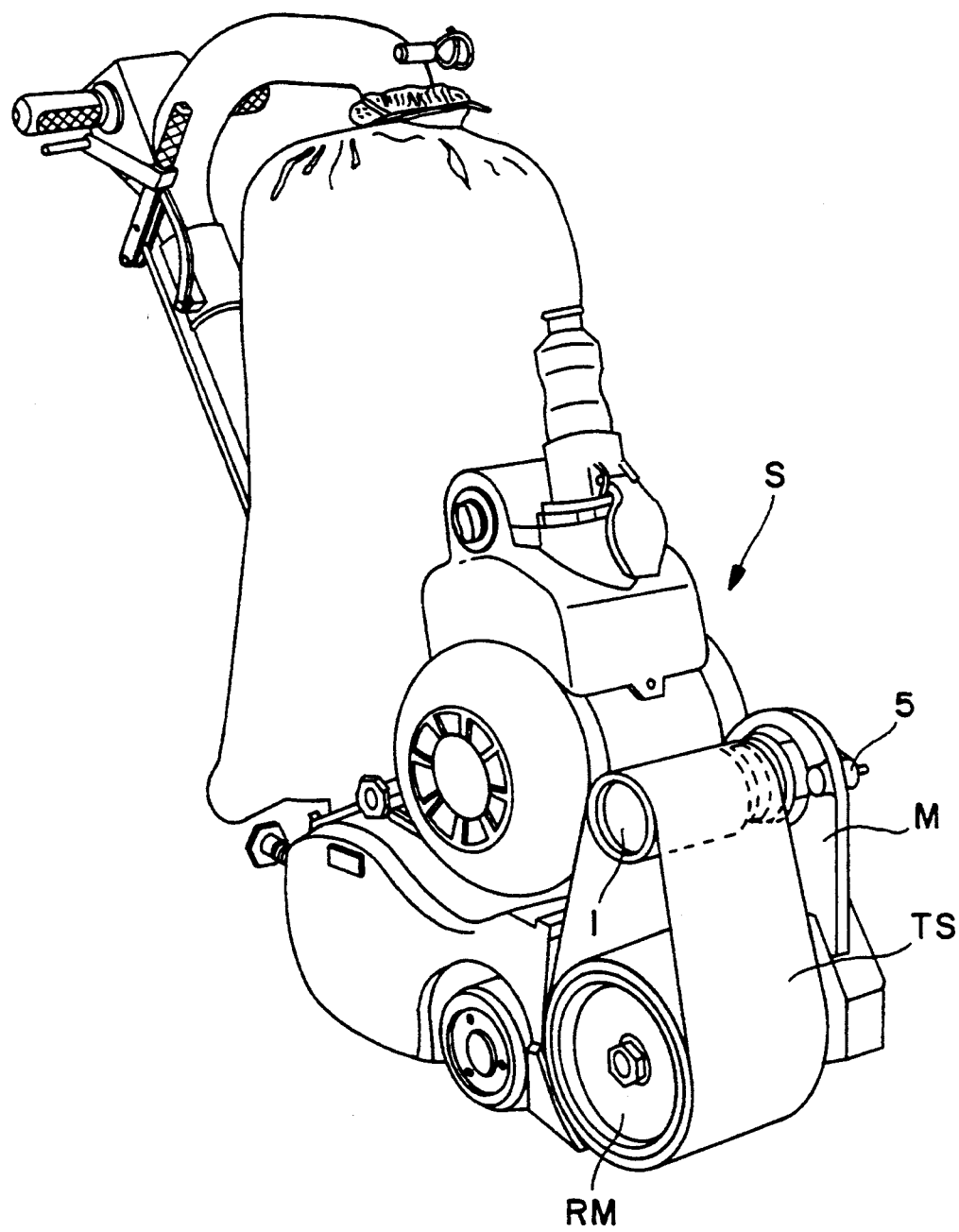
FIG. 3 shows a belt sander for wooden floors, equipped with the tension roller comprising the automatic belt centering device of FIGS. 1 and 2.

The shaft 2 of the roller 1 is mounted cantilevered on an adjustable oscillating support 5, which can be mounted, by means of a screw 6, onto a bracket M of the frame of the belt sander S shown in FIG. 3. Said support 5 is apt to oscillate, thanks to the bearings 6A, about the axis 6B of the screw 6, under the action of a spring (not shown) which tends to move the shaft 2—and thus the roller 1—away from the roller RM, in order to tension the belt TS. Furthermore, by acting on the screw 6, the support 5 can be adjusted in respect of the bracket M, along the axis 2A of the shaft 2 of the roller 1, so as to center the belt TS on the roller RM. As shown in FIG. 2, the shaft 2 is mounted on the support 5 so as to oscillate about a pin 7 orthogonal to the screw 6. The position of the shaft 2 is adjustable by operating a screw 8 of the support 5, which opposes a spring 9 in correspondence of an extension 10 of said shaft 2. It is thus possible to set (and adjust, when required, by operating the screw 8) the inclination of the shaft axis 2A in respect of the rotation axis of the driving roller RM of the belt sander S (or, more generally, of the driving roller of any belt motion system).

The minor roller portion 3 of the roller 1 is mounted on the shaft 2, rotatable but not inclinable in respect of the axis 2A, and is carried on bearings 3A by an eccentric sleeve 11, a bell-shaped part 11A of which is mounted rotating on the shaft 2, by way of bearings 11B, and comprises a projecting tailpiece 11C. The minor roller portion 3 is of frustoconical shape, at least in correspondence of its part close to the support 5.

The shaft 2 also carries the major roller portion 4 of the roller 1, which is rotatable as well as inclinable in respect of the axis 2A.

More precisely, according to the invention, the portion 4 is mounted revolving, by way of bearings 4A, on a bush 12, which is in turn mounted coaxially around the shaft 2, radially spaced therefrom. The bush 12 is apt to oscillate in respect of the shaft 2, thanks to an interposed ball joint 13, but it cannot rotate due to the presence of a transversal pin 14. A unilateral contact ball constraint 15 is moreover provided between a tailpiece 12A of the bush 12 and the tailpiece 11C of the eccentric sleeve 11 carrying the minor roller portion 3 of the roller 1. A cylindrical helical spring 16—one end 16A of which is fixed to the bush 12, housing said spring, and the other end 16B of which is fitted into the end of the shaft 2—causes the inclination of the bush 12 in respect of the shaft axis 2A, in the direction allowed by the constraint of the contact ball constraint, 15, simultaneously imparting the same inclination on the major roller portion 4 of the roller 1.

If the described belt motion system is applied to the belt sander S of FIG. 3, the tension roller 1 is free to oscillate-by rotation about the axis 6B of the screw 6 for mounting the support 5—so as to draw close to the driving roller RM, or move away therefrom, against the action of the belt tensioning spring (not shown), and thereby ensure the correct tension of the belt TS.

On the horizontal plane of FIG. 2, along the axis 2A, the roller 1 is balanced between two forces. In fact the spring 16, acting on the bush 12, tends to incline this latter, and to position the major roller portion 4 of the roller 1 inclined in respect of the axis 2A of the shaft 2 and of the axis of the driving roller RM. The belt wound on the driving roller RM and the tension roller 1 is thus forced to position itself with an edge onto the frustoconical surface of the minor roller portion 3 of the roller 1. On the other hand, the tensioned belt section winding around the rollers acts onto said frustoconical portion 3 of the roller 1, and this action—due to the eccentricity of the portion 3 in respect of the shaft axis 2A—tends to produce— through a force acting in correspondence of the unilateral contact ball constraint 15—an inclination of the major portion 4 of the roller 1, and thus of the bush 12, in a direction opposite to that in which acts the spring 16 (said inclination being of course allowed by the unilateral contact ball constraint 15 between the sleeve 11 and the bush 12): the major portion 4 of the roller 1 thus tends to go back in alignment with the axis of the shaft 2, and the belt wound around the rollers RM and 1 tends to be shifted towards the free end of the roller 1 and out of the same.

A suitable choice of the characteristics of the spring 16 will thus allow to obtain, along the axis 2A of the shaft 2 (on the horizontal plane of FIG. 2), conditions of balance of the mechanism, which conditions are apt to guarantee the continuous and efficient automatic centering of the belt: in fact, when the belt tends to move out of engagement from the rollers RM and 1 (possibly ending up by slipping off said roller 1), the action of the tensioned belt section onto the minor portion 3 of the roller 1 becomes weaker, while that of the major spring 16 grows stronger; the roller portion 4 then takes up the inclination required to move the belt back into the correct position. The contrary happens when the belt tends to slip over the frustoconical end of the minor roller portion 3: it is then the action of the tensioned belt section which increases, prevailing over that of the spring 16, so as to restore the conditions of balance.

As can be seen, the device according to the invention- through a constant balance of the mechanism and of the forces acting therein-therefore allows the belt to take up a position which, though varying continuously, always remains very close to the ideal position.

It is evident that the device according to the invention lends itself to a very wide number of different applications, wherein use is made of endless belts mounted on a pair of rollers, a driving roller and a tension roller.

Though the case illustrated herein refers to cantilevered rollers, the invention applies equally well—and with the same advantages—to the case in which the roller shafts are supported at both ends. In this case, the tension roller comprises three portions: a major, inclinable and rotatable, central portion; and two minor, simply rotatable, frustoconical lateral portions, each mounted onto a sleeve eccentric in respect of the roller shaft; two unilateral contact ball constraints being provided between the ends of the bush of the central portion and the eccentric sleeves of the two lateral portions, and two springs being provided to cause the inclination of said bush.

In the case—described in detail further above—of an emery cloth belt, used on belt sanders for wooden floors comprising cantilevered rollers, the advantages obtained with the device according to the invention are nevertheless particularly important, considering how easily in said machines—due to the very difficult working conditions—the belts slip off the rollers, or need to be repositioned due to misplacement.

It is understood that there may be other embodiments of the device according to the invention, differing from the one heretofore described and illustrated, both for what concerns its application to belt sanders for wooden floors, and—even more so—in case of applying it to other technical fields or to different types of machines. It is thus possible to vary, for example, the methods and means to support the shaft of the tension roller, the systems to adjust the position of said shaft, the type and positioning of the springs causing the inclination of the major portion of the tension roller. For instance, said springs may suitably be spiral springs which, instead of being applied to the bush on which is mounted and revolving the major roller portion, are applied on the eccentric sleeves on which is mounted and revolving the minor roller portion, and this arrangement will produce exactly the same effect, allowing the operator to obtain the balance of forces on which the working of the device according to the invention is based. All these variants, and the embodiments derived therefrom, fall by full right within the protection scope of the present invention.

I claim:

1. A tracking device for an endless belt moving on a pair of rollers comprising:
   a driving roller;
   a tension roller (1) formed in at least two parts:
      a minor portion (3), close to an oscillating support (5) of a roller shaft (2), mounted—rotatable but not inclinable in respect of said shaft (2)—onto an eccentric rotary sleeve (11), having a part closest to said oscillating support (5) being of frustoconical shape; and
      a major portion (4), mounted revolving on a bush (12) coaxial to the roller shaft (2) and inclinable on a ball joint (13) but not rotatable in respect of said shaft (2);
      a unilateral contact ball constraint (15) being provided between said sleeve (11) and said bush (12); and
      at least one spring (16) being provided to cause the inclination of said bush (12) in respect of the roller shaft (2) in the direction allowed by said constraint (15);
   wherein said endless belt (TS) adjusts automatically to center on the pair of rollers (RM, 1), without any intervention of an operator, as a consequence of a dynamic balance of forces obtained during operation.

2. Device as recited in claim 1), wherein said rollers (1, RM) are mounted cantilevered, and wherein said tension roller (1) comprises only one minor portion (3) and a single spring (16) to cause the inclination of said bush (12).

3. Device as recited in claim 1), wherein said rollers (1, RM) are mounted on two end supports, and wherein said tension roller (1) comprises two minor portions (3), positioned at the sides of a single larger central portion thereof, and two springs (16) to cause the inclination of said bush (12).

4. Device as recited in claim 1), wherein said bush (12) is prevented from rotating on the roller shaft (2) by a transversal pin (14).

5. Device as recited in claim 1), wherein said spring (16) is a helical spring, housed into said bush (12) and fixed thereto at one end (16A), while an opposite end (16B) is fixed onto one end of the shaft (2).

6. Automatic mechanical centering device for endless belts moving on a pair of rollers-a driving roller (RM) and a tension roller (1)-characterized in that the tension roller (1) is formed in at least two parts: a minor portion (3), close to an oscillating support (5) of a roller shaft (2), mounted—rotatable but not inclinable in respect of said shaft (2)—onto an eccentric rotary sleeve (11), its part closest to said support (5) being of frustonconical shape; and a major portion (4), mounted revolving on a bush (12) coaxial to the shaft (2) and inclinable on a ball joint (13) but not rotatable in respect of said shaft (2); a unilateral contact ball constraint (15) being provided between said sleeve (11), and said bush (12), and at least one spring (16) being provided to cause the inclination of said bush (12) in respect of the shaft (2) in the direction allowed by said constraint (15);

wherein said shaft (2) of the tension roller (1) is carried by the support (5), axially adjustable by acting onto a screw (6) for mounting said support (5).

7. Device as recited in claim 6), wherein:

said shaft (2) of the tension roller (1) is mounted on said support (5) by a pin (7) orthogonal to the screw (6), and further wherein the inclination of said shaft (2) in respect of an axis of the driving roller (RM) is varied by oscillation about said pin (7) due to opposing action of an adjusting screw (8) and of a return spring (9).

* * * * *